United States Patent [19]

Rao

[11] 4,225,354
[45] Sep. 30, 1980

[54] CRYSTALLINE ADDITIVE FOR MAGNESIUM ALUMINA SILICATE

[75] Inventor: V. Durga Nageswar Rao, Bloomfield Hills, Mich.

[73] Assignee: Ford Motor Company, Dearborn, Mich.

[21] Appl. No.: 958

[22] Filed: Jan. 4, 1979

Related U.S. Application Data

[63] Continuation-in-part of Ser. No. 824,942, Aug. 15, 1977, abandoned.

[51] Int. Cl.² .................. C03C 3/22; C04B 35/18; C04B 35/20
[52] U.S. Cl. .................. 106/39.8; 106/39.6; 106/60; 106/62; 106/73.1; 106/73.33; 106/73.4; 260/42.11; 264/63; 264/65
[58] Field of Search .................. 106/39.8, 39.7, 39.6, 106/62, 73.3, 73.4, 73.1; 65/33; 264/63, 65

[56] References Cited

U.S. PATENT DOCUMENTS

| | | | |
|---|---|---|---|
| 3,112,184 | 11/1963 | Hollenbach | 165/10 |
| 3,146,114 | 8/1964 | Kivlighn | 106/39.8 |
| 3,464,880 | 9/1969 | Rinehart | 65/33 |
| 3,542,571 | 11/1970 | Smith | 106/39.8 |
| 3,607,790 | 9/1971 | Pitha | 106/73.4 |
| 3,883,337 | 5/1975 | Helgesson et al. | 65/33 |
| 3,885,977 | 5/1975 | Lachman et al. | 106/62 |
| 3,940,255 | 2/1976 | Harrington et al. | 106/39.8 |
| 3,979,216 | 9/1976 | Fritsch et al. | 106/62 |
| 4,063,955 | 12/1977 | Fritsch et al. | 106/39.6 |
| 4,118,237 | 10/1978 | Beall et al. | 106/39.7 |

FOREIGN PATENT DOCUMENTS 1158434  11/1963  Fed. Rep. of Germany ............. 106/45

Primary Examiner—Helen M. McCarthy
Attorney, Agent, or Firm—Donald J. Harrington; Keith L. Zerschling

[57] ABSTRACT

A micro-crystalline material and method for making the same wherein a vitreous material known as magnesium aluminum silicate or cordierite glass is caused to undergo a high temperature solid state conversion to a crystalline material and wherein the crystallization is catalyzed by using a nucleating agent on the surface of the base material to trigger microscopic grain formation, the base material that is used being in the form of a fine frit or powder.

4 Claims, 7 Drawing Figures

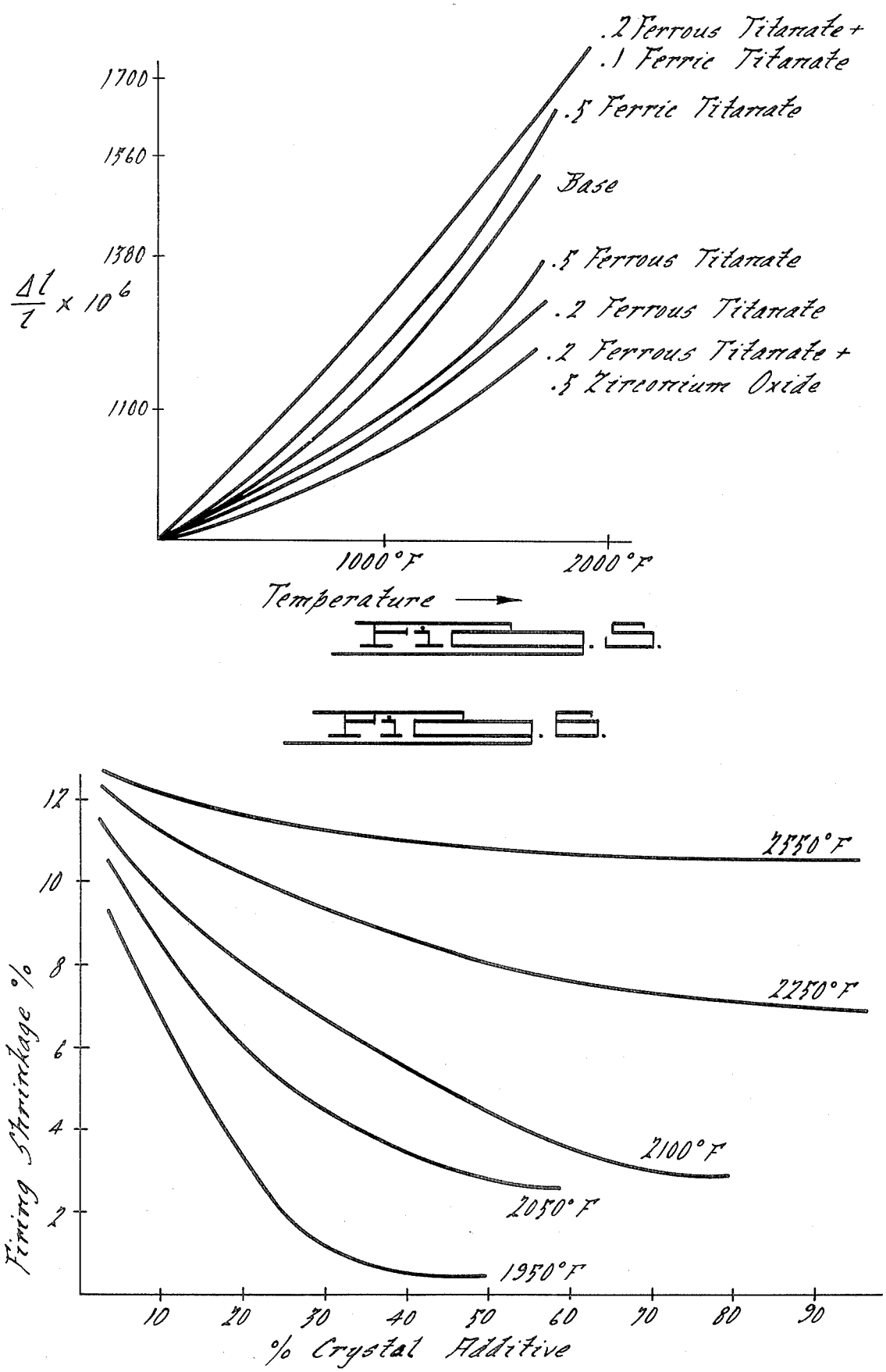

CRYSTALLINE ADDITIVE FOR MAGNESIUM ALUMINA SILICATE

REFERENCE TO RELATED APPLICATION

This application is a continuation-in-part of U.S. application Ser. No. 824,942, filed Aug. 15, 1977, now abandoned.

BRIEF DESCRIPTION OF THE INVENTION

My invention relates generally to formation of complex ceramic parts that are subjected to severe thermal stresses. It is particularly useful in forming gas turbine regenerator matrices where internal passages in the matrix are subjected alternately to hot exhaust gases and cooler inlet air for the combustor. In forming a regenerator matrix, a polymer binder is mixed with a glass frit and rolled to form a flexible ribbon. One side of the ribbon has ribs. The ribbon then is wound about itself to form a cylindrical structure, the ribs providing passageways extending in an axial direction.

In a gas turbine environment hot gases pass through the passages of the regenerator in one direction when the regenerator core is in one position, and cool gases pass through the same passages in the opposite direction when the regenerator core is angularly displaced. The core structure thus is subjected to repeated heating and cooling which creates thermal shock due to the severe changes in temperature.

Cordierite or MAS material ($2MgO.2Al_2O_3.5SiO_2$) is noted for its anistropic characteristics, and it is useful in the manufacture of regenerators because of its low thermal expansion coefficient. The physical characteristics of cordierite and its crystallization properties have been described by Zdaniewski in a publication entitled "Journal of Material Science", published by Chapman & Hall, Ltd. in 1963, pages 192–202. A cordierite material is described also in U.S. Pat. No. 3,885,977. The so-called MAS material is used in a powder or frit form and in the firing cycle the particles fuse together.

The MAS glass material has a higher coefficient of thermal expansion than crystalline material, and its higher elastic modulus does not permit it to absorb the thermal stresses characteristic of heat exchanger application. Moreover, the glass is unstable and readily converts to crystalline material when heated to temperatures above 1600° F. The MAS glass material, however, is subject to controlled crystallization and the crystallization is through nucleation primarily in the matrix.

In general, the bond strength and the bond area between the grains determines the strength characteristics of crystalline ceramics. The finer the grain size, the larger is the area of bonding surface and higher is the strength. During normal sintering treatments, fewer nuclei are generated resulting in a coarse grained structure and, therefore, a weaker material. The strength is further reduced by the aggravated thermal stresses resulting from the well known anistropic thermal expansion of the cordierite crystal.

It is an object of this invention, therefore, to produce cordierite type crystalline ceramic of very fine grain size starting with very fine particle size glass powder and promoting extensive nucleation at the particle surface during sintering by means of nucleating agents such as ferrous titanate added to the powder.

BRIEF DESCRIPTION OF THE FIGURES OF THE DRAWINGS

FIG. 5 is a chart similar to FIG. 4 showing the effect of adding excess additives or additives that tend to enter solution with the glass during the sintering process.

FIG. 6 is a chart showing the effect of additives on the degree of shrinkage of a regenerator matrix.

PARTICULAR DESCRIPTION OF THE INVENTION

MAS materials which are of cordierite type ($2MgO.2Al_2O_3.5SiO_2$) are commercially available for the fabrication of regenerators or complex ceramic parts. An organic binder is used in the fabrication of regenerators to retain MAS glass powder or glass frit. The mixture of the glass frit and the binder is rolled into a ribbon, and the ribbon is wound about itself to form a cylindrical structure. The matrix then is fired, and the binder is burned off at a relatively low temperature leaving the glass matrix. This process is described in a paper entitled "Regenerator Material, Processes and Properties" presented at the Third Materials Conference—Turbine Applications, Ann Arbor, Michigan, Oct. 30, 1974. It was authored by E. A. Bush.

The glass frit used in the fabrication of the regenerators is in the form of a fine powder. The glass frit is sintered after the fabrication procedure. The MAS glass material has a relatively higher coefficient of thermal expansion than the crystal and thermal stresses are developed in a poorly crystallized glass which results in cracking of the material. The strength of the material is insufficient to accommodate the stresses developed by the differential thermal expansion.

The glass is fired to effect crystallization of the glass in an effort to improve its strength. Completely crystallized glass has a higher strength, and it is also relatively stable. It is common practice during the firing cycle for thermal expansion to occur in the order of 1,600 parts per million when heated from room temperature to 800° centigrade. The desirable thermal expansion for regenerator materials, however, should be about 500 parts per million.

Figure 1A:
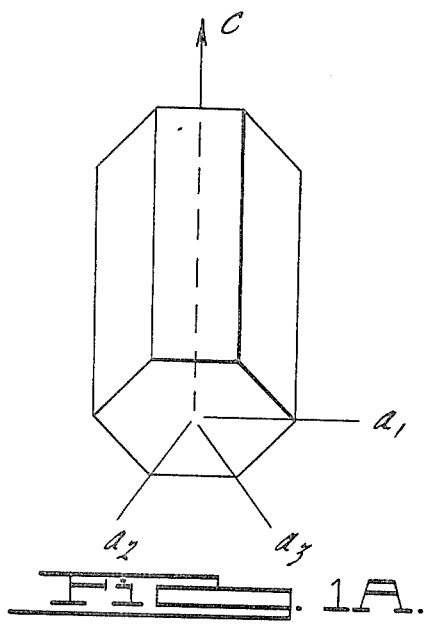
FIG. 1A shows an anistropic crystal with arrows that designate the direction of expansion or contraction.
Figure 1B:
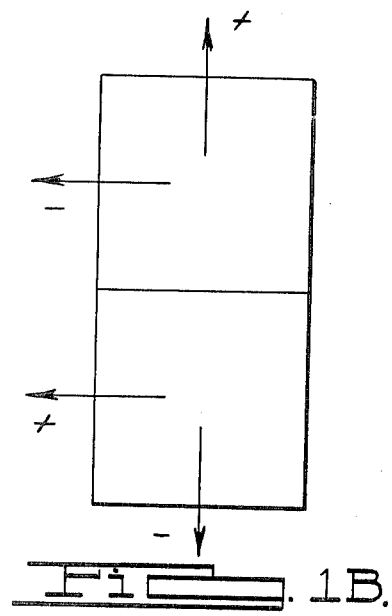
FIG. 1B is a diagrammatic representation of an anistropic bi-crystal with arrows indicating the directions of expansion or contraction.

During the fabrication process, the strength capabilities of the crystalline material often are exceeded, which results in cracking as mentioned earlier. In MAS materials, the crystallinity is such that the thermal expansion is anistropic; that is, each particle expands at different rates in different directions as illustrated in FIG. 1B. The bi-crystal of FIG. 1B contains two crystals of the type shown schematically in FIG. 1A where the C axis is the direction of expansion or contraction and the components of the expansion or contraction can be illustrated by the axis $A_1$, $A_2$ and $A_3$. The expansion along the C axis illustrated in FIG. 1B for one element of the bi-crystal ideally is equal to and of opposite sign from the C axis expansion of the other member of the bi-crystal so that the change in dimension is zero. This ideal relationship does not necessarily exist, but there is a tendency for the change in one dimension of the by-crystal to be counteracted by a change of opposite sign in another part of the bi-crystal.

The organic binder is driven off at a temperature of about 250° to 350° centrigrade. Sintering of the glass frit occurs at about 1500°–2000° Fahrenheit although sintering may occur at high temperatures in the case of certain other types of cordierite materials such as mineral base matrices.

Figure 2:
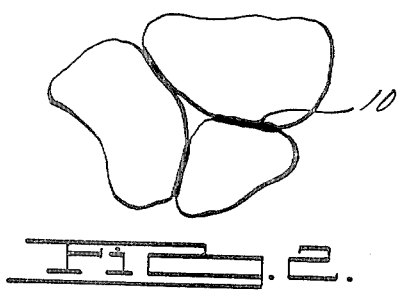
FIG. 2 is a schematic representation of bonded crystal particles.

During the sintering operation, the particles tend to bond together as illustrated in FIG. 2. The bond interface within two particles is illustrated in FIG. 2 by reference character 10. As the particles grow, the voids between them are absorbed and the surfaces between the particles grow together. Nucleating agents may be added to the glass material to effect extensive crystallization to reduce the grain size and therefore increase the strength and reduce the thermal expansion.

The negative expansion or contraction of each particle in one axis may be offset by the positive expansion in the direction of another axis so that in a random distribution it is possible that the net expansion may be zero for the statistical average for the two axes over the entire mass. This is shown, for example, in FIG. 3. This ideal condition is illustrated in FIG. 1B. The bond between the individual crystals should be sufficient to absorb the differential expansion below a critical crystal size. Actually the bond surface will increase as the particle size decreases for any given unit volume of material. The finer the grain size, the more the crystal will be capable of absorbing the stresses generated by differential expansion.

Figure 3:
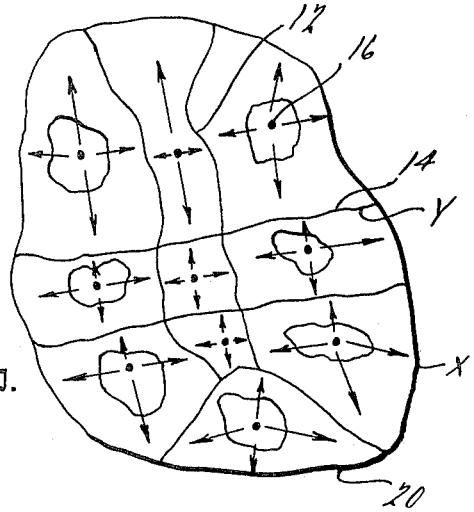
FIG. 3 is a schematic representation of a crystalline particle showing the directions of growth of individual crystals in a matrix.

FIG. 3 shows the direction of the growth of the particles beginning with a nucleus. The various crystals grow until they reach a bond interface, such as the interfaces shown at 12 and 14. The nucleus for one crystal is shown at 16 and each of the other crystals shown in the matrix 20 has a similar nucleus. The arrows indicate the direction of crystal growth. If the grain size is small enough and the crystals are of random orientation, the differential expansion in one direction will be counteracted by the differential expansion of one of the other particles in the opposite direction to approach a zero net expansion for the statistical average value for the two directions.

A fine grain size can be achieved by introducing nucleating agents into the glass itself. As the glass is heated, the nucleating agent precipitates out first, and will grow as indicated in FIG. 3. The glass particles define a matrix 20. Upon reheating and before crystalization of the glass begins, the nucleating agent is precipitated out to form nuclei in large numbers.

The starting particles of glass may be 30 microns in size. The nucleating agents are precipitated out to form grains of three microns or less in size.

A principal feature of my invention comprises the addition of a nucleating agent to the fine glass powder. The nucleating agent, which is ferrous titanate $FeO \cdot TiO_2$ is added to the surface of the particles. Normally the nucleating agents that are added to the body of the material are sensitive to heat treatment and the crystal growth is inflexible. Nucleating agents added to the surface, however, make possible a more controlled grain growth. The surface is a very desirable site for depositing nucleating agents since the excess free energy of the surface provides the activation energy for the crystal growth. The addition of a nucleating agent to the surface will cause the crystal to grow as soon as the particle is heated above the critical temperature for crystal growth. The presence of the nuclei causes growth of the crystal through the two adjoining grains, thereby increasing densification and strength.

The nucleating agent, for example, ferrous titanate, is ball-milled, preferably with a glass powder. The ferrous titanate is softer than the MAS material so that it will be smeared on the surface of the MAS frit. When the particle is heated at a temperature where crystallization of glass begins, there is a tendency for nucleation at the surface wherever there is a seed crystal thus resulting in a fine sintered grain size.

If nucleation starts from inside the particle and the crystal growth is completed before sintering, it may leave voids. In the present invention, however, crystallization is triggered at the surface as soon as sintering begins.

Initial sintering is needed to get bonding in the first instance to create the strength as needed, but at the same time crystallization is generated in such a way that a finer grain size is achieved, and the grain growth is initiated right at the bond surface. The ball mill media preferably are made of the same MAS material as the glass frit itself. In the normal ball-milling operation, an aluminum oxide ball is used, but such normal ball-milling might contaminate the mix. A zirconium oxide ball will not contaminate the mix since zirconium oxide picked up during the ball-milling operation is harmless if less than 0.5% by weight. Indeed, to some degree the presence of zirconium oxide is desirable up to 0.5% by weight.

Figure 4:
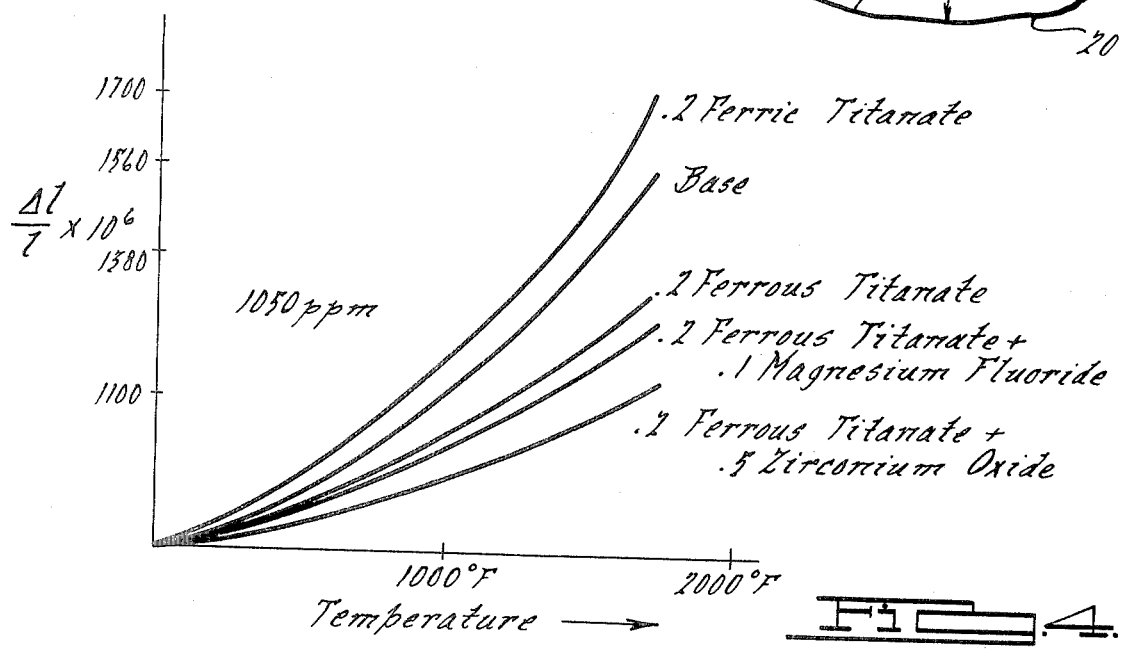
FIG. 4 is a chart showing the effect of additives to a cordierite glass material powder on the coefficient of thermal expansion of sintered bars.

In FIG. 4 I have illustrated the effect of the addition of ferrous titanate to the MAS material. If 0.2% to 0.4% by weight of ball-milled ferrous titanate is added to the magnesium alumina silicate glass, the coefficient of thermal expansion of the crystalline ceramic is reduced. The addition of magnesium flouride also may have a beneficial effect up to 0.1%. The addition of 0.5% by weight of zirconium oxide and 0.2% ferrous titanate will result in an expansion coefficient of about 1050 parts per million at 800° Centigrade. On the other hand, if the additive is allowed to oxidize or if ferric titanate is added to the mix, the coefficient of the thermal expansion is increased. In FIG. 4 the addition of 0.2% by weight of ferric titanate to the mix will cause an expansion rate of 1,700 parts per million. This is due to the fact that the ferric titanate may go into solution with the glass. The adverse effect of the presence of ferric titanate on the coefficient of expansion and tensile strength is shown also in the data of the table set forth later in this specification.

Zirconium oxide reduces expansion but not as much as ferrous titanate. Ferrous titanate can easily be oxidized to ferric titanate, so steps must be taken to avoid that. Otherwise the coefficient of expansion will deteriorate. If the firing of the binder and the glass frit mixture occurs in a closed furnace, the binder is allowed to burn off at a relatively low temperature, thereby reducing or exhausting the oxygen. If a closed furnace is used, magnesium flouride and zinc and zirconium oxide individually do not have a large influence; but they do provide a slight improvement especially if used with ferrous titanate.

Some glass frit contains barium oxide and a slight amount of $V_2O_5$. That material has a lower coefficient of thermal expansion to begin with or even prior to the addition of the ferrous titanate, and the ferrous titanate will still reduce the thermal expansion.

It is undesirable to allow the ferrous titanate to be added in excess of above 0.4% or 0.5%. If an excess amount of ferrous titanate is ball-milled with the powder, the excess is deposited on the surface of the glass frit. This excess may go into solution with the crystals already formed at the sintering temperature or it may be transformed into ferric titanate as explained earlier. Ferric titanate tends to increase the coefficient of thermal expansion which is the opposite result from what is desired. If ferrous titanate goes into solution in large proportion it may cause a major change in crystallinity of the material. This phenomenon is described for the base LAS, lithium aluminum silicate, materials by Jesse Brown in a paper entitled "Solid State Reaction Differential Expansion of Ferrous Materials and Systems Containing Zinc Oxide and Other Selected Oxides", which was published in 1964 by Pennsylvania State University, Microfilm No. 656725. If the amount of ferrous titanate that goes into solution is small, it may not cause a deleterious effect since there would be no fundamental changes in crystallinity. The presence of magnesium flouride may have a desirable effect up to 0.1% by weight. The same is true of zirconium oxide in quantities of up to 0.5%. Beyond those percentages, in moderate amounts, magnesium flouride and zirconium oxide merely act as extraneous materials but do not cause a deleterious effect on the quality of the crystalline structure. However, excessive amounts cause an increase in thermal expansion. The shrinkage that occurs during firing is a maximum for glass particles that are nonnucleated. The particles grow in size as the bonding surfaces between the particles are eliminated and as the voids between the particles are absorbed. Glass particles that are nucleated internally have a large degree of shrinkage, as indicated in FIG. 6, while glass particles that are both internally nucleated and surface nucleated have the least amount of shrinkage. In the latter case, crystal growth occurs on the surface and proceeds internally generating a large number of crystals. The result is an article of a very minimum grain size.

A crystalline powder additive of the same chemical composition as the starting glass (base) material can be added to the ferrous titanate, and the mixture then can be ball milled to produce a fine powder mix (referred to as seed crystal in the Table following) consisting of particles in a size range from about ½ micron to 40 microns (this mix is added to the base material in an amount between 2% and 60% by weight—FIG. 6). This triggers crystal growth during the subsequent sintering operation.

The following table illustrates the effect of adding ferrous titanate, zirconium oxide and magnesium flouride to the base MAS material or cordierite:

TABLE

| COMPOSITION | Tensile Strength & Thermal Expansion - at 800° C. |
|---|---|
| Base Material + 0.2% $FeO.TiO_2$ (2050° F.) | 11,000 psi–13,000 psi 1,050 ppm–1,250 ppm |
| Base Material + 0.4% $FeO.TiO_2$ (2050° F.) | 8,000 psi–10,000 psi 1,200 ppm |
| Base Material + 0.2% $Fe_2O_3.TiO_2$ | 11,000 psi–13,000 psi 1,600 ppm–1,800 ppm |
| Base Material + 0.4% $Fe_2O_3.TiO_2$ (2050° F.) + 0.4% $ZrO_2$ (2050° F.) | 11,000 psi–13,000 psi 1,900 ppm 11,000 psi 1,550 ppm |
| Base Material + 0.2% $FeO.TiO_2$ 0.4 $Z_rO_2$ (2050° F.) | 11,000 psi–13,000 psi 1,050 ppm–1,200 ppm |
| Base Material + 0.2% $MgF_2$ (Lower sintering temperature below 2050° F.) | 13,000 psi 1,400–1,550 ppm |
| Base Material + 0.2% $FeO.TiO_2$ + 0.4% $ZrO_2$ + 0.2% $MgF_2$ | 12,000 psi 1,050–1,150 ppm |
| Base Material + Seed crystal 5% <20 micron size | 10,000 psi 1,250–1,450 ppm and <5% firing shrinkage |

What I claim and desire to secure by U.S. Letters Patent is:

1. A process for forming an anistropic polycrystalline part of very fine grain size, low thermal expansion and very low firing shrinkage comprising grinding a magnesium aluminum silicate glass material with 0.2 to 0.5% of ferrous titanate into a fine powder, mixing with the said fine powder a quantity of crystalline powder of the same chemical composition as the glass material the quantity of which is less than approximately 60% and more than approximately 2% by weight, ball-milling the mixture to very fine particle size in the ½ micron to 40 micron range, adding the mixture to an organic polymer binder to facilitate forming of the finished part, said binder being capable of being burned off at a relatively low temperature, sintering the fabricated glass particles in a reducing or neutral atmosphere at temperatures of approximately 2,000° F. to effect bonding of the particles together and to trigger crystallization of the particles, the crystallization occurring initially at the surface of the particles thereby increasing the bond strength of the particles and increasing the strength of the material and reducing the thermal expansion.

2. The process as set forth in claim 1 wherein the addition of ferrous titanate is supplemented by the addition of approximately 0.5% by weight of zirconium oxide and approximately 0.2% by weight of magnesium flouride to increase the strength of the crystalline structure and to accelerate crystalline growth.

3. The process as set forth in claim 1 wherein the addition of ferrous titanate is supplemented by the addition of approximately 0.5% by weight of zirconium oxide to increase the strength of the crystalline structure and to accelerate crystal growth.

4. The process as set forth in claim 1 wherein the addition of ferrous titanate is supplemented by the addition of approximately 0.2% by weight of magnesium flouride to increase the strength of the crystalline structure and to accelerate crystal growth.

* * * * *